Jan. 27, 1948.   R. LACK   2,435,086
CAT-HEAD WITH REPLACEABLE SLEEVE
Filed April 24, 1945
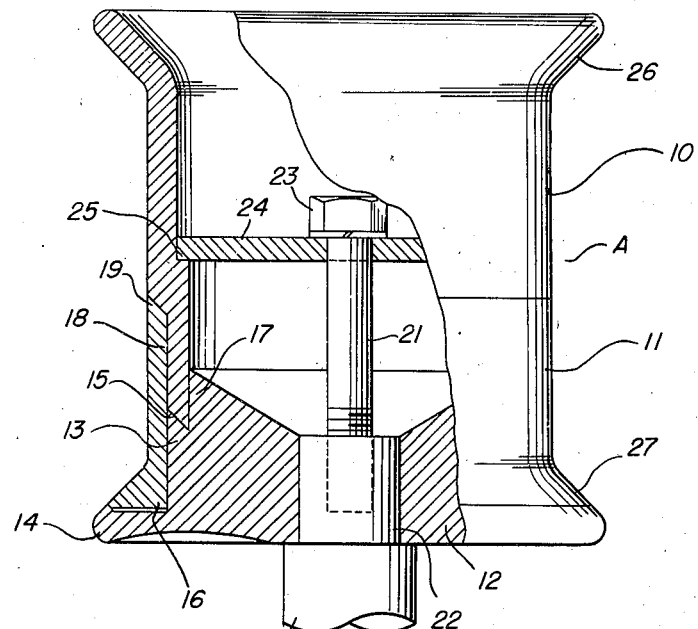
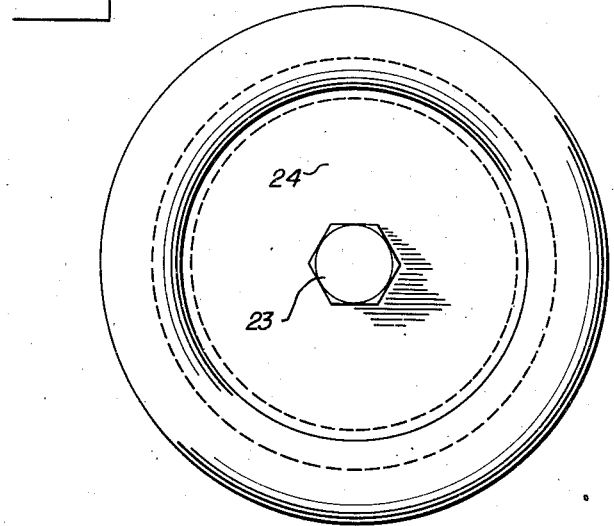
INVENTOR.
ROBERT LACK
BY *Victor J. Evans & Co.*
ATTORNEYS Patented Jan. 27, 1948

2,435,086

UNITED STATES PATENT OFFICE 2,435,086

CATHEAD WITH REPLACEABLE SLEEVE

Robert Lack, Bakersfield, Calif.

Application April 24, 1945, Serial No. 590,042

1 Claim. (Cl. 242—117)

The invention relates to a replaceable sleeve for a cat-head used in oil-field machinery.

The primary object of the invention is the provision of a sleeve of this character, wherein a cathead, when it becomes worn by a rope to render it unsafe for further use, can be reconditioned by such sleeve, so that the head can be replaced on the job with dispatch and at a minimum cost, the reconditioning in this manner of the head being effective for the elimination of welding and machining or grinding to size, as would be required without the replacement sleeve.

Another object of the invention is the provision of a cat-head, wherein it is of sectional construction, involving a replacement sleeve, so that when the head unduly wears, it can be conveniently reconditioned with a new sleeve and in this manner increasing the life of said head.

A further object of the invention is the provision of a cat-head of this character, which is simple in construction, thoroughly reliable and efficient, readily and quickly reconditioned, strong, durable, and inexpensive to manufacture and install.

With these and other objects in view the invention consists in the features of construction, combination and arrangement of parts as will be hereinafter more fully described, illustrated in the accompanying drawing, which shows the preferred embodiment of the invention, and pointed out in the claim hereunto appended.

In the accompanying drawing:

Figure 1 is an elevation, partly broken away, of the cat-head constructed in accordance with the invention.

Figure 2 is an end view thereof.

Similar reference characters indicate corresponding parts throughout the several views in the drawing.

Referring to the drawing in detail, A designates generally a cat-head in its entirety constructed in accordance with the invention and comprises a sectional flanged spool-like body, which involves the interfitting cylindrical replacement sleeve sections 10 and 11, respectively, and an end head 12, the latter being of circular contour and at the inside face thereof is built a hub portion 13, which is centered and reduced with respect to the diameter of the said head 12. This head 12 concentric to the hub portion 13 provides a peripheral annular flange beading 14 thereto.

The hub portion 13 is provided with an outer peripheral dovetail like step 15 circumferentially in its side wall, so that the sleeve sections 11 and 10 will telescope over this hub portion with the said sections snugly seated at 16 and 17, respectively, in the head 12, while the said sections are telescopically interfitted with each other in overlapped relation to one another. In this interfitting the sleeve section 11 is counterseated at 18 within the sleeve section 10 through the step formation 19 externally of the latter.

The sections 10 and 11, and the head 12 are replaceably fastened together and held secured to a spindle or axle 20 by a headed screw bolt 21 which is tapped into the reduced terminal 22 of the spindle or axle 20, while the head 23 of such bolt binds against a clamping disk 24, which is removably seated on an annular internal shoulder 25 formed in the sleeve section 10, as best seen in Figure 1 of the drawing.

The sleeve sections 10 and 11 are formed with outside reversely beveled annular flange edges 26 and 27, respectively, the edge 27 being in merging relation to the flange bead 14 of the head 12 when the cat-head is assembled, as best seen in Figure 1 of the drawing.

It should be apparent that the sleeve sections 10 and 11 are replaceable when the same become worn and unsafe or unfit for further use, resultant from a rope winding on and unwinding from the cat-head during employment in oil-field machinery.

The cat-head assembly as before described enables reconditioning procedure thereto at a minimum cost and with dispatch, thus increasing the life of such head through sleeve replacements.

What is claimed is:

A cat-head of the kind described, comprising separably interfitted replacement sleeve sections, an end head detachably supporting said sleeves, an annular internal shoulder formed in one of said sleeve sections, a clamping disk seated on said shoulder means engaging said disk at the center thereof for detachably clamping the sleeves and end head interfitted with each other, a spindle carrying the end head and detachably connected with said first named means, and a hub on the end head and having interfitting connection with the said sleeves by means of a circumferential dovetail seat at the upper marginal edge thereof, and the complementary shaped marginal edge of one of said sections.

ROBERT LACK.

REFERENCES CITED

The following references are of record in the file of this patent:

UNITED STATES PATENTS

| Number | Name | Date |
|---|---|---|
| 1,927,673 | Allen | Sept. 19, 1933 |
| 2,218,742 | Butler | Oct. 22, 1940 |
| 2,320,901 | Webster | June 1, 1943 |

FOREIGN PATENTS

| Number | Country | Date |
|---|---|---|
| 286,459 | Great Britain | Mar. 8, 1928 |